Jan. 20, 1959 M. M. SCHIFFMAN 2,869,250
INFORMATION INDICATING DEVICES
Filed July 13, 1956 3 Sheets-Sheet 1
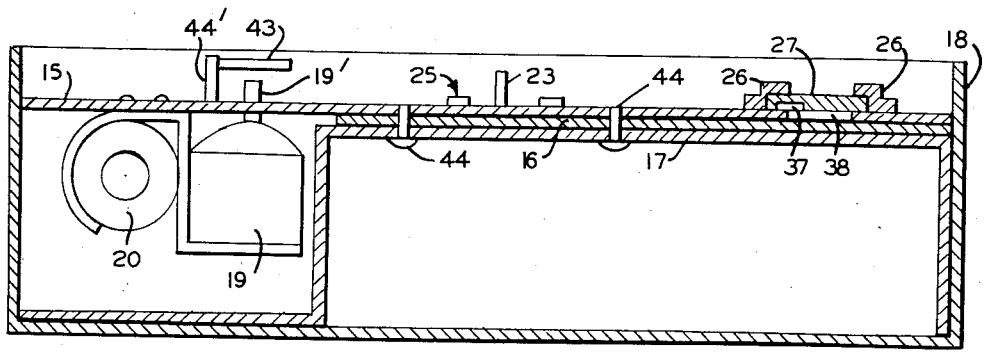
Fig-1
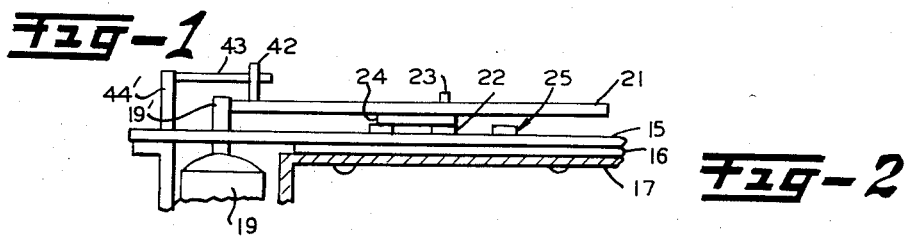
Fig-2
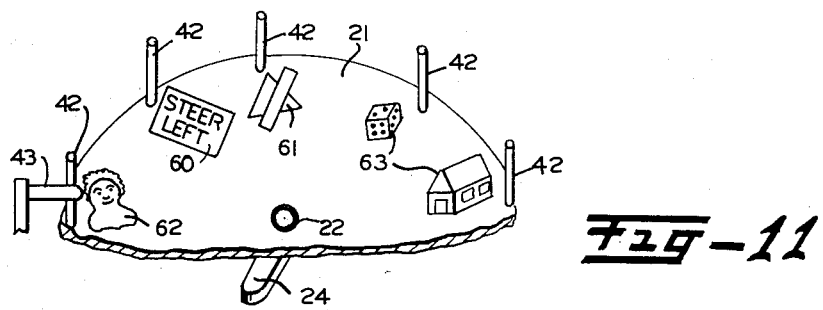
Fig-11
Fig-12
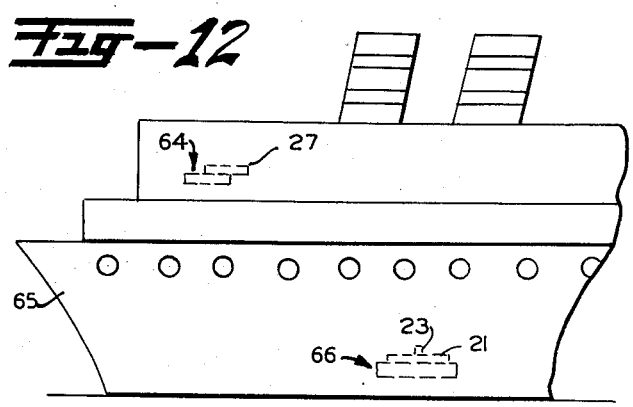
INVENTOR,
MURRAY M. SCHIFFMAN,
BY 
ATTORNEY Jan. 20, 1959 M. M. SCHIFFMAN 2,869,250
INFORMATION INDICATING DEVICES
Filed July 13, 1956 3 Sheets-Sheet 2

INVENTOR
MURRAY M. SCHIFFMAN,
By
Attorney

Jan. 20, 1959   M. M. SCHIFFMAN   2,869,250
INFORMATION INDICATING DEVICES
Filed July 13, 1956   3 Sheets—Sheet 3
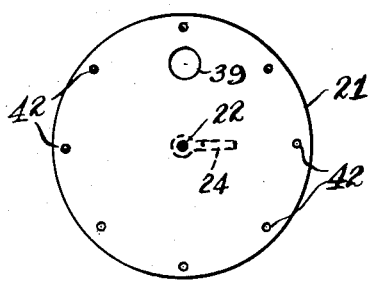
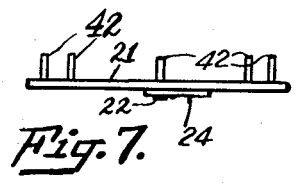
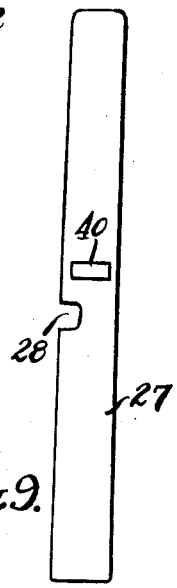
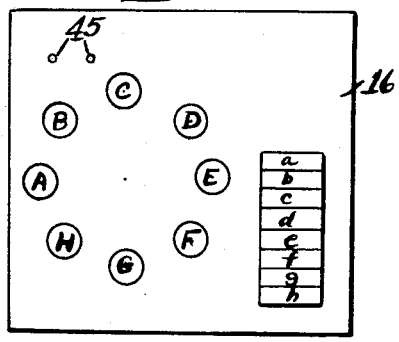
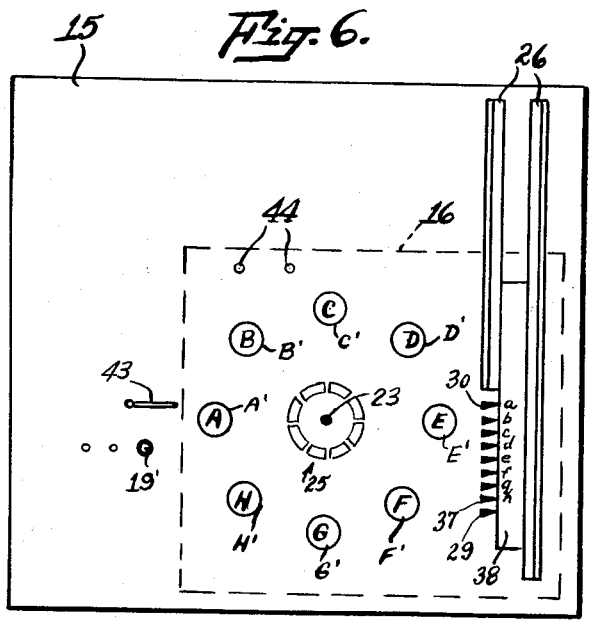
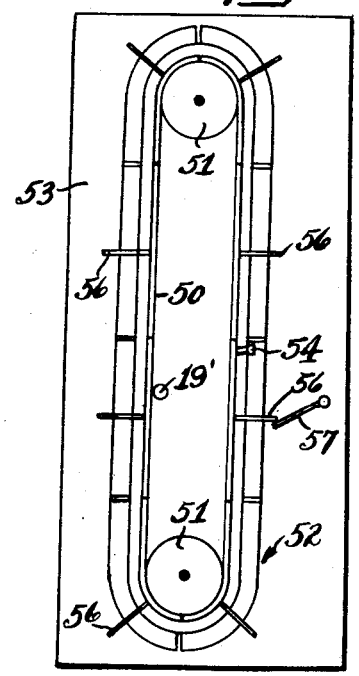
INVENTOR,
Murray M. Schiffman,
By- *(signature)*
Attorney

# United States Patent Office 2,869,250
Patented Jan. 20, 1959

2,869,250

INFORMATION INDICATING DEVICES

Murray M. Schiffman, New York, N. Y.

Application July 13, 1956, Serial No. 597,795

6 Claims. (Cl. 35—9)

The present invention relates to devices employable in the construction of question and answer games, direction givers, information indicators and the like.

The principal object of this invention is to provide novel and improved devices including a selector which when set to a chosen indicia, will cause a movably mounted member to shift its position automatically, whereupon it will come to rest to indicate indicia related to the indicia chosen by the selector. The term "indicia" as here used, shall include printed matter, insignia or intelligence of all kinds.

Another object thereof is to provide novel and improved devices of the character mentioned, employing a member having an endless periphery as for instance, a revolvably mounted disc or an endless belt-like member mounted for movement on pulleys and where by means of a controlled electric motor, such member is selectively moved from one position to another position of a given series of predetermined positions. A further object thereof is to provide novel and improved devices of the character set forth, which are reasonably cheap to manufacture, easy to operate and efficient in carrying out the purposes for which they are designed.

Other objects and advantages will become apparent as this disclosure proceeds.

For the practice of this invention, the disc or belt to be controlled, carries an electrically-conductive brush or arm, for contacting successive conductive segments arranged in the manner of a commutator on a fixed member. The commutator segments are slightly spaced and lie in and substantially fill a ring lane. Near the apparatus so far described, or remote therefrom, there is a selective device having a movable element which is set to determine the position the disc or belt is to be moved to. This movable element may be an elongated strip set to be slid longitudinally along a track. There are spaced contact points along this track, which are electrically connected respectively to a commutator segment; there being one such contact point for each commutator segment. The said slidable member has a cut-out so that any one of the contact points is at any one time, out of contact with said slidable strip. Such slidable strip is electrically conductive, hence all contact points in contact therewith will be in electrical connection. The brush arm is electrically connected to one terminal of an electric motor arranged to drive the disc or belt slowly. The other terminal of said motor is electrically connected to one terminal of an electric battery or other source of energy supply. The other terminal of said battery is electrically connected to the sliding strip which is the selector. A switch is interposed in the motor circuit and is normally in open condition. Also provided is a means to brake the disc or endless belt so that the latter be controlled at each of the commutator segments or at regions akin to their relative positions.

It will be shown that the motor always comes to rest when the brush arm is entirely on the commutator segment related to the contact point at the cut-out in the control member, because in such instance, the motor circuit is open. Provision is also made to have indicia along the track of the selector member and at the positions of the commutator segments. The indicia along the track may be printed questions, while the indicia arranged as the commutator, may be answers thereto respectively. It will also be shown that the sequence of questions need not be the same as the sequence of the answers, and yet the correct answer will be indicated in all instances. Various other forms of related indicia will be set forth to be used in accordance to the specific function this invention is called upon to perform. All the above, is one form this invention may assume.

To explain this invention in detail, I have chosen to employ it for a question and answer game apparatus illustrated herein, which is one example for its adaptation. Full disclosure of this invention, various of its applications and its mode operation will now be set forth.

In the accompanying drawings forming part of this specification, similar characters of reference indicate corresponding parts in all the views.

Fig. 1 is a sectional view taken by passing a vertical plane across an upright box which is open-top and contains a Question and Answer game apparatus embodying the teachings of this invention. An upper disc whose movement is to be controlled, is omitted in this view.

Fig. 2 is an enlarged view of a part of Fig. 1, including said top disc.

Fig. 5 is a top face view of the sheet which has the printed matter thereon.

Fig. 6 is a top face view of the board member laid atop the printed sheet and is also a top plan view of Fig. 1 minus the outer box member.

Fig. 7 is an elevational view of the disc which sets over the board member of Fig. 6.

Fig. 8 is a top plan view of Fig. 7.

Fig. 9 is a face view of a strip member which serves to select the question to be answered.

Fig. 10 is a top plan view of a modified structure.

Fig. 11 is a fragmentary perspective view of a modified form of disc whose movement is to be controlled.

Fig. 12 is a diagrammatic view of another modified construction which will be explained.

Figure 3:
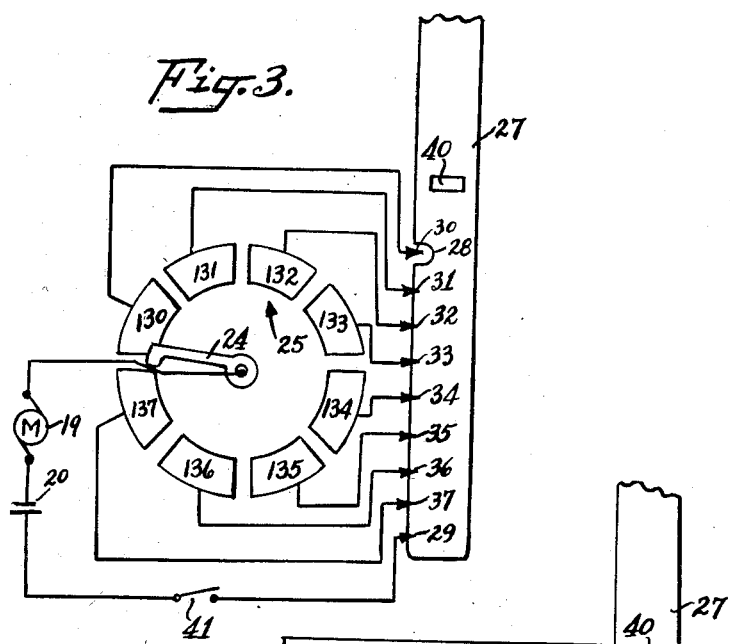
Fig. 3 is a diagrammatic representation of the electrical wiring system.

In the drawings showing one form this invention may assume, the numeral 15 designates a board which sets atop a printed sheet 16 which rests on a table 17 within an open-top upright box 18. The table occupies only part of said box to leave space for an electric motor 19 and a battery 20 which are mounted on the underside of said board 15. Said motor is positioned so that its shaft 19') is vertical and extends above the upper surface of said board through a suitable opening therefor. The member whose movement is to be controlled, is in this embodiment made to be the disc 21 which has an eyelet 22 at center by which said disc is set for rotation on the vertical axis pin 23 extending upwardly from the board 15. The underside of said disc carries a metallic brush arm 24 which as the disc is rotated, makes contact with successive contact elements arranged in the form of a commutator identified generally by the numeral 25 which is around the axis pin 23 on the upper side of the board 15.

On the board 15, there are tracks 26 for the slidably mounted elongated strip member 27 which is electrically conductive and provided with a notch 28 in one longitudinal edge thereof at mid region. On the board 15, along said notched edge of the slide strip 27, is a series of spaced contact points which equal in number the segments constituting the commutator 25. These contact points are denoted by the numerals 30 through 37 respectively. Their spacing is such that any one may be cleared by the notch 28 of the slide member 27, and their position is such that those not at notch position, are all in contact with the slide member. For making electrical connection to said slide member, contact point 29 may be provided.

Between the tracks 26, the board 15 has a window 38 of a length at least equal to the distance taken up by the contact points 30—37 therealong. The printed sheet 16 has questions printed thereon in spaced relation as are said contact points. Such questions are indicated across the regions occupied by the letters *a* through *h* and only one at a time is viewable through the window 40 in the slide member 27. The position of this window 40 on the slide member is such that it will exposed question *a* when the notch 28 clears the contact point 30. The distance between the printed questions *a* through *h* on the printed sheet 16, and the distance between the contact points 30 through 37, are equal and identical.

The board 15, has a series of identical and equi-spaced openings A′ through H′ therethrough about the commutator 25. Viewable through said openings in the board 15, are the answers A through H on the printed sheet 16. The arrangement of the questions and answers on the printed sheet will be shown to depend upon the system of electrical connections. Two such systems are shown, as will now be described.

Figure 4:
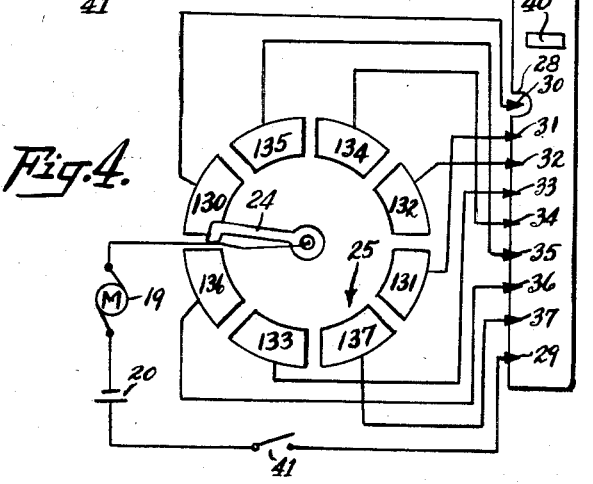
Fig. 4 is a similar view of a modified form of the wiring system.

In the electrical system shown in Fig. 3, the contact points 30 through 37 are electrically connected in regular sequences to the commutator segments 130 through 137 respectively, while in the system shown in Fig. 4, the order of connection is irregular. In both systems, the commutator segment is numbered one hundred higher than its associated contact point which is along the slide member 27. It is to be noted that in each system, all commutator segments are of equal dimension and are spaced close enough that the brush arm 24 will contact any two adjacent ones simultaneously. The brush arm 24 is electrically connected to one terminal of the series connected group comprising the motor 19, the battery 20 and the optional switch 41. The other terminal of this group is electrically connected to the slide member 27 through the contact point 29. The motor shaft 19′ frictionally engages the periphery of the disc 21. There is a hole 39 in the disc in the lane of the openings A′ through H′ in the board 15. Said disc is preferably provided with a series of pins 42 spaced thereon about center and equally spaced because in this embodiment the commutator segments are equal. A flexible blade, spring 43, extending in cantilever fashion from a standard 44′ fixed to the board 15, is able to brush said pins 42 as the disc turns while the motor 19 is powered, but such spring and pins cooperate to brake disc movement when the motor receives no power, so that a pin on the disc will stop at the spring blade 43.

Regardless of the electrical system used, meaning whether that shown in Fig. 3 or that shown in Fig. 4, the disc 21 is so set that brush arm 24 shall contact that commutator segment which is associated with the contact point which is in the clear in the notch 28 of the slide member 27 by which the question desired to be answered, is set. The switch 41 in the motor circuit is in open condition. All segments of the commutator 25 are electrically connected except that one which is related to the contact point in the clear at said notch in the selector slide member 27. Even if the switch 41 is set to close, the motor 19 will not operate, because there is open circuit. Closed circuit exists and hence motor 19 will operate only when the brush arm 24 is on a commutator segment which is connected to one of the contact points along the slide member 27 which is in contact with such member.

Consider the apparatus to be in the condition shown as in Fig. 3. Contact point 30 is cleared by the notch 28, and brush arm is on the commutator segment 130. There is open circuit and the motor is at rest, whether switch 41 is open or closed. Set said switch in open condition and shift the slide so that contact point 31 is within said said notch and close the switch 41. Contact point 30 being in contact with the slide member, current will flow to the motor to operate same until the disc 21 is turned to a position where brush arm 24 is off commutator segment 130 whereupon it will be solely in contact with commutator segment 131, whereupon there is open circuit, current to the motor will stop and the disc will be stopped quickly by the braking action of blade spring 43 against a pin 42 which it now contacts. The disc 21 will have been turned one-eighth of a revolution; there being eight commutator segments, in the embodiment shown.

Now open the switch 41 and shift the slide member 27 to say a position where contact point 36 is cleared by the notch 28. Close the switch and the disc will turn until the brush arm 24 which it carries will reach commutator segment 136. The disc will have turned six eighths of a revolution.

Since the answers A–H are related to the position of the questions *a–h*, the disc will stop at the position related to the setting and the answer related to the question setting will be viewable through the opening 39 in the disc which registers with the holes A′–H′ in the board 15, one at a time.

If the electrical system used is that of Fig. 4, the same manipulations will cause five-eighths of a turn because of the first setting so that contact point 31 is stationed in the notch 28, and then because of the second setting where contact point 36 is set in the notch, the disc will turn four eighths of a turn.

In the use illustrated, the motor need be of slight power so that it can be run by a dry cell battery 20 as used in a flaslight, and the motor is uni-directional in this instance counter clockwise so that the disc rotate clockwise.

The disc 21, the board 15 and the printed sheet 16 can be removed from the box and are separable from each other. This permits the printed sheet to be changed and it is advisable to have locating pins 44 extending a bit upward of the table 17 for locating the printed sheet which has holes 45 for such purpose. Similar provision is made in the board 15 to locate it on said pins 44.

Instead of questions and answers, the printed sheet may exhibit other related indicia, in words, pictures or other insignia for the communication of intelligence. If desired, the printed sheet portion under the disc may be omitted and such disc 21 may have printed matter 60 or other insignia 61 or even statuettes 62 or other solid figures 63 thereon at the region at each pin 42 as shown in Fig. 11; the blade spring 43 serving as a pointer thereto. The solid figures will of course be related to the question at the selector and may be deemed information elements which they really would be. Also, the selector part of the apparatus comprising the slide member 27, its track 26, and contact points 30–37 and 29 therealong and that portion of the sheet 16 of Fig. 5, which shows the items *a–h*, may be remote from the remainder. For example, the selector part shown diagrammatically and indicated by the numeral 64, may be on the bridge of a ship 65 and the remainder shown diagrammatically and indicated by the numeral 66 may be in the engine room, so that predetermined order may be given from the bridge to the engine room. Since such code of orders can be permanent, such orders may be printed on the top face of the disc 21, as for example the one specimen order shown at 60 and the spring 43 shall then act as the pointer therefor.

Instead of the disc, the controlled movable member may be an endless belt or tape 50 mounted to "run"

on the pulleys 51. In such instance the commutator would comprise the arrangement shown at 52 where its segments are on a fixed board 53. The contact arm 54 would of course be carried by the belt 50 which is driven by the motor shaft 19'. One way of getting electrical connection to the contact arm 54 would be to have the belt and its pulleys conductive and the lead connected to a shaft of one of the pulleys; such shaft also being electrically conductive.

The belt 50 is divided into sections akin to the commutator segments carrying indicia respectively related to the indicia on the selector means. Pins 56 extending from the endless belt 50, act to brake belt movement in cooperation with the cantilever blade spring 57, which latter may act as a pointer to the belt sections, one at a time.

For game purposes as illustrated, the box 18, the table 17 and the board 15 as well as the disc 21, may be of paper board, plastic or other suitable sheet material. For convenience and economical manufacture, the boards 15, 53 should be of a di-electric material because the contact points 29, 31–37 and the commutator segments 131–137 and those of 52 are mounted thereon in the embodiments shown.

This invention is capable of numerous forms and various applications without departing from the essential features herein disclosed. It is therefore intended and desired that the embodiments described herein shall be deemed illustrative and not restrictive and that the patent shall cover all patentable novelty herein set forth; reference being had to the following claims rather than to the specific description and showing herein to indicate the scope of this invention.

I claim:

1. In an information-indicating device, the combination of a member having an endless periphery, mounted for movement so that such periphery moves about the area it encompasses, a stationary commutator structure comprising a plurality of electrically conductive segments, arranged spaced in a formation substantially concentric with said periphery, an electrically conductive contact arm moving with said member, in contact with at most two successive segments while it is in motion, an electric motor with means arranged to move said member in the manner mentioned when such motor is actuated, a source of electrical energy, a plurality of spaced fixed electrically conductive contact points, one for each of said segments, an electrically conductive selector element having a cut-out, movably positioned whereby any one of said contact points is encompassed by said cut-out and spaced therefrom while all remaining contact points are in contact with said selector element; the segments of the commutator being electrically connected to said contact points respectively; said motor and energy source as a group, being in electrical series connection; such group having end terminals; the said selector element being electrically connected to one of the terminals of said group and the contact arm being electrically connected to the other of said terminals, whereby the motor will be deactuated when the contact arm reaches and contacts only the commutator segment connected to the contact point at said cut-out; a first means set by said selector element, indicating different indicia at each position of said element when a contact point is encompassed by the cut-out respectively and a second means set by the mentioned member, indicating indicia at each stopped position of said member upon deactuation of the motor; the last mentioned indicated indicia being related to the indicia indicated by the first means due to the positioning of the said selector element.

2. The device as defined in claim 1, including braking means acting to stop the mentioned member upon deactuation of the motor.

3. The device as defined in claim 1, wherein the successive contact points are electrically connected respectively to successive commutator segments.

4. The device as defined in claim 1, wherein at least two successive contact points are electrically connected to commutator segments which have at least one commutator segment between them.

5. The device as defined in claim 1, wherein the contact points are electrically connected to the commutator segments in irregular order.

6. The device as defined in claim 1, including an electrical switch included in series electrical connection in the mentioned group.

References Cited in the file of this patent

UNITED STATES PATENTS

| | | |
|---|---|---|
| 1,374,179 | Benson | Apr. 12, 1921 |
| 1,564,872 | McMullen | Dec. 8, 1925 |
| 1,948,712 | Hornung | Feb. 27, 1934 |
| 2,312,773 | Palmer | Mar. 2, 1943 |

FOREIGN PATENTS

| | | |
|---|---|---|
| 903,397 | France | Jan. 15, 1946 |